United States Patent [19]

Allen

[11] Patent Number: 5,551,976

[45] Date of Patent: *Sep. 3, 1996

[54] SUPERPLASTICIZER-CONCRETE COMPOSITION FOR WASTE DISPOSAL

[75] Inventor: William C. Allen, Pasadena, Calif.

[73] Assignee: Union Oil Company of California, El Segundo, Calif.

[*] Notice: The term of this patent shall not extend beyond the expiration date of Pat. No. 5,525,155.

[21] Appl. No.: 361,425

[22] Filed: Dec. 21, 1994

Related U.S. Application Data

[63] Continuation-in-part of Ser. No. 238,682, May 5, 1994, Pat. No. 5,525,155.

[51] Int. Cl.$^6$ .................................................. C04B 18/04
[52] U.S. Cl. ........................ 106/696; 106/692; 106/694; 106/697; 106/714; 106/716; 106/724; 106/725; 106/802; 106/809; 106/816; 106/823; 166/293; 405/266; 588/252; 588/257; 524/3; 524/650
[58] Field of Search ........................... 106/692, 697, 106/724, 725, 816, 809, 823, 802, 696, 694, 714, 716; 405/266; 166/293; 588/252, 257; 524/3, 650

[56] References Cited

U.S. PATENT DOCUMENTS

| | | | |
|---|---|---|---|
| 4,069,870 | 1/1978 | Gallus | 166/293 |
| 4,114,692 | 9/1978 | Gallus | 166/293 |
| 4,144,077 | 3/1979 | Gallus | 106/97 |
| 4,256,499 | 3/1981 | Terrel | 106/70 |
| 4,298,634 | 11/1981 | Phelps | 427/183 |
| 4,432,666 | 2/1984 | Frey et al. | 106/697 |
| 4,588,443 | 5/1986 | Bache | 106/97 |
| 4,761,182 | 8/1988 | Whitescarver et al. | 106/98 |
| 4,830,994 | 5/1989 | Schuetz | 501/127 |
| 4,950,552 | 8/1990 | Amend et al. | 428/626 |
| 4,979,992 | 12/1990 | Bache | 106/644 |
| 5,122,554 | 6/1992 | Allen | 524/8 |
| 5,151,126 | 9/1992 | Ranc et al. | 106/719 |
| 5,163,715 | 11/1992 | Rickard et al. | 285/55 |
| 5,176,752 | 1/1993 | Scheiner | 106/737 |
| 5,209,603 | 5/1993 | Morgan | 405/52 |
| 5,236,231 | 8/1993 | Allen et al. | 285/55 |
| 5,240,293 | 8/1993 | Allen et al. | 285/55 |
| 5,276,074 | 1/1994 | Allen | 524/8 |
| 5,304,709 | 4/1994 | Babcock et al. | 106/697 |
| 5,346,012 | 9/1994 | Heathman et al. | 166/293 |
| 5,374,307 | 12/1994 | Riddle | 106/697 |

FOREIGN PATENT DOCUMENTS

570199   3/1993   Japan .

OTHER PUBLICATIONS

Anderson, "Cement and Concrete Research", vol. 16, pp. 931–940, (1986). U.S.A., Pergamon Journals, Ltd. (no month) The Effect of Superplasticizers and Air Entraing Agents on the Zeta Potential of Cement Particles.
Kalajian, et al., "Oil Ash Stabilization Using Phosphogypsum", pp. 209–213. (Date Unknown).
Singh et al., "Effect of Superplasticizers on the Hydration of Cement", Cement and Concrete Research, vol. 22. pp. 725–735, (1992), U.S.A., Pergamon Press, Ltd. (no month).
Arturo Ruio Renato Turriziani, "The Affect of Superplasticizing Agents on the Penetration of Aggressive Ions Into Cement Concretes and on Their Resistance to Attack by Aggressive Solutions", pp. 171–182. Apr. 1981.
Kosmatka et al., "Design and Control of Concrete Mixtures", Thirteenth Edition, DCA, 1988, p. 18. (no month).

*Primary Examiner*—Mark L. Bell
*Assistant Examiner*—Michael Marcheschi
*Attorney, Agent, or Firm*—Gregory F. Wirzbicki; Alan H. Thompson

[57] ABSTRACT

A solidified waste is formed from a difficult-to-compact hydraulic cement slurry for use in the disposal of hazardous waste. The slurry contains inorganic non-compactible hydraulic cement particles, a concrete superplasticizer compound, water, and filler particles containing radionuclide and/or toxic contaminants. The slurry is then transferred to a storage vessel, such as a subterranean formation, to cast a stronger, denser solidified waste than a comparable solidified waste containing no superplasticizer.

54 Claims, No Drawings

SUPERPLASTICIZER-CONCRETE COMPOSITION FOR WASTE DISPOSAL

RELATED APPLICATIONS

The application is a continuation-in-part application of U.S. patent application Ser. No. 08/238,682, filed May 5, 1994, U.S. Pat. Ser. No. 5,525,155, the disclosure of which is incorporated by reference in its entirety herein.

FIELD OF THE INVENTION

This invention relates to a method for the disposal of radioactive and hazardous waste by preparing cementitious compositions. More specifically, the invention is related to compositions of hydraulic cements used to solidify hazardous chemical and radioactive wastes.

BACKGROUND OF THE INVENTION

The disposal of hazardous chemical and/or radioactive waste (herein "waste") is desirable to minimize health and environmental risks. The hazard potential of such a waste is reduced by converting the contaminants (e.g., chemical and/or radionuclide toxic contaminants) into a reduced soluble, mobile or toxic form, i.e., stabilization. In one disposal method, the contaminants contained in the waste are stabilized by converting the waste materials to solidified waste by a solidification process wherein a solidifying agent, such as a hydraulic cement, is added to the waste to encapsulate the waste in a monolithic solid of high structural integrity (such as structural concrete material). The encapsulation may be of relatively fine solid waste particles (i.e., micro-encapsulation) or of a relatively large block or container of wastes (i.e., macroencapsulation). It is desirable that solidification mechanically bind the waste into the concrete sufficiently for the solidified waste to exhibit acceptable leachability, i.e, to pass one or more well-recognized leaching tests, such as those of The American Nuclear Society (ANS 16.1 Test), the State of California Waste Extraction Test (WET), and the United States Environmental Protection Agency (EPA) tests including the Extraction Procedure Toxicity Test (EPT), the Multiple Extraction Procedure (MEP), and the Toxicity Characterization Leaching Procedure (TCLP). Chemical and/or radionuclide toxic contaminant migration in the solidified waste is typically restricted (stabilized) by vastly decreasing the surface area exposed to leaching and/or by isolating the wastes within a relatively impervious capsule. One type of solidified waste contains an inorganic cementitious material such as a hydraulic Portland cement or a Portland cement plus other additives (such as lime, flyash and/or clay).

Precursors of solidified waste material contain a variety of waste-containing fillers and solidifying (cementing) agents, and form a hydraulic slurry when mixed with water. Waste-containing fillers are capable of being converted to a monolithic solid (such as concrete) after being combined with the solidifying agent. Examples of such fillers are silicious sludge obtained from silica-rich geothermal brine, Naturally Occurring Radioactive Materials (NORM), and tailings from mining operations. The hydraulic slurry, which can temporarily flow like a liquid or be pumpable (by ordinary concrete pumping means), is applied to the interior of a storage vessel, and permitted to cure (slowly hydrate or precipitate) into a rigid, hardened solidified waste that stabilizes the contaminants. Examples of storage vessels are subterranean formations such as caverns, fissures and cracks in the rocks or formation material, plugged or abandoned petroleum or geothermal wells (including fractured wells), abandoned mines, and molded forms such as blocks stored in landfills. The slurry may set or be cured "insitu" in the storage vessel.

During storage, some hydraulic (water-based) cements (e.g., Portland cement), fillers and, hence, monolithic solids made from the slurry, are subject to attack by external influences that may cause destabilization. When new components are used to produce stabilized solidified wastes, the primary considerations are that the components: 1) produce a workable slurry which can be applied to the interior of the storage vessel; 2) harden into a solidified waste which desirably attaches to the interior of the storage vessel; 3) resist long term changes effected by temperature, pressure, chemical (e.g., dissolution, corrosion, etc.) and mechanical (e.g., erosion, pulverization, etc.) attack, and the like; and 4) provide an effective barrier to attack of the surrounding material of the storage vessel. The solidified waste should also be rugged, safe, reliable, environmentally acceptable, and cost effective.

A common problem with some current monolithic (concrete) compositions useful for producing solidified waste is their propensity to crack. Such cracks allow attack of the encapsulated waste and the migration of the waste contaminants from the solidified waste. In subterranean storage vessels, geothermal applications can subject the solidified wastes to severe conditions. These conditions may crack brittle materials, particularly those experiencing tensile stresses. Many such materials are noted to shrink upon setting or curing. Shrinkage increases the tensile stress within the solidified waste and provides a void space within the container which can act as a migratory conduit. Cracking may even occur during preparation. An expansive or non-shrinking cement may be employed in the solidified waste material to maintain size and/or to generate compressive strength within the material in order to offset or circumvent shrinkage. Often such cements may not compact sufficiently to produce a desired matrix density of the hardened material or monolithic.

Additives are being sought to improve the compactibility of the solid slurry components, hence densifying the resulting solidified waste material. This will reduce shrinkage, thereby increasing the material's resistance to cracking and reduce porosity and permeability, consequently decreasing waste contaminant migration.

SUMMARY OF THE INVENTION

The invention is related to a method for the disposal of hazardous chemical and/or radioactive waste (i.e., waste) by preparing a solidified waste containing a monolithic solid containing a hydraulic cement, a filler having chemical and/or radioactive toxic waste contaminants, and a superplasticizer. The invention further encompasses the solidified waste composition and slurry precursor compositions thereof. The method is useful for stabilizing the waste contaminants from environmental (chemical or physical) attack that causes contaminant migration from the solidified waste.

Although concrete plasticizing or superplasticizing additives (i.e., superplasticizers) have been previously employed during the preparation of hydraulic cement concretes to reduce a desired water-to-cement ratio, in the method of this invention a monolithic (typically concrete) solidified waste is prepared by mixing sufficient quantities of water with an aggregate component (containing cement and waste-containing solid fillers) and at least one active superplasticizer component to produce a mobile, easy-to-transport slurry whose aggregate components can be readily settled or compacted and permitted to harden to encapsulate waste. Normally the waste-containing filler particles of the aggregate component are concurrently mixed with the cement, water and superplasticizer, and the resultant mobile slurry transferred to and introduced into a storage vessel, such as a subterranean formation, where insitu hardening (i.e., curing) occurs. The matrix of the cured monolithic solidified waste is preferably a homogeneous distribution of hydraulic cement, radioactive and/or chemical toxic waste-containing filler particles, and superplasticizer components, but is usually devoid of other polymeric matrix components (other than those of the waste or superplasticizer components).

Due to the presence of the superplasticizer, normally a commercial concrete superplasticizer, the solid particles of an otherwise difficult-to-compact cement/waste slurry can be more easily compacted, and to a smaller volume, than essentially the same slurry that lacks a super-plasticizer. When a liquid component containing a relatively small amount of active superplasticizer component (usually about 0.01 to 5.0 weight percent relative to dry aggregate component(s)) is added to a mixture of hydraulic cement and waste-containing filler particles (i.e., aggregate component), not only is the slurry volume minimized, but the compactibility of the particles during the eventual hardening of the solidified waste material is also enhanced. Such enhancement occurs in the presence of relatively small amounts of free water in the slurry, and particularly in slurries containing aggregate components that require a relatively high demand for water to set. Hence, due to volume minimization and enhancement in settling efficiency of the solid particles by the presence of superplasticizer and minimal free water, the method of the invention produces a pre-set cementitious, contaminant-laden material of high density. The cured and hardened superplasticizer-containing solidified waste is not only more compact and restrictive of contaminant migration than its counterpart without superplasticizer, but has enhanced compressive strength while still containing sufficient water to fully activate (i.e., hydrate or precipitate) the cement. In some instances, the increase in compressive strength is dramatic—on the order of at least 100 percent compared to similar materials prepared without superplasticizer.

Enhancement in the acceptable compressive strength of the solidified waste yields a more effective waste disposal system. Suitable strengths are obtained when the waste-containing filler particles are macrofine particles, i.e., of size having an average cross-sectional dimension greater than about 1 micron (as measured by, for example, a Coulter counter), and particularly when both the filler particles and cement particles are macrofine sizes. Typically acceptable leachabilities of solidified wastes, particularly those stored above earth ground level (such as in landfills), are attained herein by encapsulating toxic waste filler particles of preferred size no greater than 2 millimeter (mm) average cross-sectional dimension (No. 10 sieve). Also, in the case of subterranean storage of the solidified waste the chemical and/or radioactive waste particles of preferred size no greater than about ¾ inches (18 mm). Such solidified waste materials can be expected to be tolerant of harsh conditions, reliable, safe, and cost effective. Moreover, the processing, handling, chemical resistance, and overall performance of solidified waste prepared by the invention can be further improved by the control of aggregate gradation and shape (round, angular, elongated, etc.), the use of pozzolanic aggregate materials and by the use of cements such as Portland, high alumina, and expansive or non-shrinking types.

DETAILED DESCRIPTION OF THE INVENTION

In the disposal method of the invention, a two component mixture is used to form a hardened, cementitious solidified waste. The mixture contains (1) solid particles (or aggregate component) containing a dry hydraulic cement and a waste-containing filler material, and (2) a liquid component containing a superplasticizer and water. Also, the superplasticizer may be added to the aggregate component either prior to or after water is mixed with the aggregate component. The mixture is a relatively easy-to-transport hydraulic slurry that is transferred to a storage vessel as a precursor composition used to form a solid concrete matrix. The slurry is mobile and flowable, and preferably at least pumpable, with the particles of the aggregate component being small enough in size to be mixed to an essentially homogenous consistency prior to set (cure). Typically the rheological properties of the slurry (without superplasticizer) can approach a non-Newtonian viscosity, such as the type found in plastic, pseudoplastic, thixotropic and dilatent materials; however, the presence of the superplasticizer in the slurry diminishes such viscosity properties to produce a slurry viscosity having a greater Newtonian character.

The two components are preferably mixed without the addition of supplemental amounts of ultrafine cement and/or filler particles (i.e., particles of size less than 1 micron), then transferred to the storage vessel, such as a subterranean formation or the interior of a well penetrating the formation, and the compacted solid material settled (gravitationally and/or mechanically) to the shape or constraints of the storage vessel prior to hardening. The slurry or the compacted solid material is normally permitted to cure or harden into the solid concrete composition in the presence of sufficient water to fully activate (such as hydrate or precipitate) the cement. ("Fully hydrate," as used herein, means the hydration of at least 95 weight percent of the ingredients of the cement that normally hydrate during the first 28 days of hardening of the cement-containing material.) The superplasticizer is typically added to relatively low dense, difficult-to-compact slurries to transform them into relatively high dense, easy-to-compact and easy-to-transport slurries. The solid particles contained in such easy-to-compact slurries (containing superplasticizer) are readily settled, usually under ordinary gravitational force, to produce a shaped, pre-set (or pre-cured) compacted solidified waste material which is denser than its counterpart lacking superplasticizer.

The shaped compacted material (i.e., resultant compacted solids composition) can be cured at ambient or at the temperature of the storage vessel to form a hardened solidified waste composition having stabilized waste contaminants. The resulting dense solidified wastes have enhanced compressive strength and are useful in stabilizing the migration of waste contaminant so that waste contaminants are relatively isolated and immobilized or not sufficiently leachable from the solids. The radioactive waste-containing solid filler particles exhibit essentially no migration in the solidified waste and the chemical waste-containing filler particles exhibit acceptable leachability, as measured by EPA tests and/or the State of California (WET) test, pursuant to government regulatory standards.

The solidified waste composition is normally the reaction product of a hydraulic cement, waste-containing filler, superplasticizer and sufficient water to fully activate (or hydrate) the hydraulic cement. The water can also contain dissolved waste contaminants. The solidified waste composition is prepared by removing additional free water from the slurry containing solid cement particles, solid waste-containing filler particles and superplasticizer by limiting the water content prior to emplacement in the storage vessel, by using natural and/or artificial settling techniques (e.g., gravitational and centrifugal casting, vibratory casting, combinations thereof, etc.) and then permitting the resultant settled solids to set and cure in the presence of water. The slurry, without superplasticizer, can be highly thixotropic and/or relatively non-compactible. The concrete superplasticizer is used to mitigate these properties during mixing, transferring and/or hardening of the slurry. A useful concrete superplasticizer contains components such as a sodium salt of sulfonated polymeric naphthalenes and melamines or lignosulfonates, with melamines, and blends thereof, being highly preferred. These superplasticizers, when used in commercial form, may be used in quantities from about 0.01 to about 10 weight percent of the dry aggregate content.

In a preferred embodiment, the hydraulic cement, concrete superplasticizer, water (preferably sufficient water to fully hydrate the cement), and any optional ingredients, are mixed with the waste-containing filler particles and the resulting hydraulic slurry composition is injected into a subterranean formation. The injection pressure is sufficient to displace the composition into the formation. Optionally, the injection pressure exceeds the pressure necessary to fracture the formation (formation fracture limit pressure). The formation fracture limit pressure varies from formation to formation and is generally empirically determined by techniques known to those skilled in the art.

Usually, the hydraulic slurry composition is injected into the formation through a well that penetrates at least a portion of the formation. More specifically, the composition is injected into the interior bore of the well, passes down the well bore, and out at least one port in the well that is in fluid communication with the formation and the interior bore. After a predetermined time, the waste-containing slurry composition solidifies and occupies a substantially fixed portion of the formation. Because the solidified waste is immobilized in the formation, adverse potential environmental risks due to the migration of the waste (particularly radionuclide or chemically toxic) contaminants into other parts of the formation, such as potable water aquifers, is substantially reduced, if not totally eliminated.

It is a preferred method that no additional ultrafine particles (cementitious, non-cementitious or waste-containing filler particles of size less than 1 micron) are mixed with the hydraulic cement/chemical-radioactive toxic filler mixture during preparation of the dry mix or water-containing slurry that is transferred to the storage vessel. The solid slurry particles, as well as the resultant compacted material derived from the solid slurry particles, contain essentially all particles of average cross-sectional dimension of at least about 1 micron (as measured by a Coulter counter), and preferably exclude distributions identified with ultrafine particles. Alternatively, the slurry or the resultant compacted material containing solid slurry particles derived therefrom consists essentially of an ordinary hydraulic cement and waste-filler material, water and the presence of a superplasticizer, and is essentially free of additional or supplementary amounts (distributions) of ultrafine cement or ultrafine filler particles.

Although the superplasticizer may be added directly to the aggregate component, the liquid component of the slurry composition usually contains a combination of superplasticizer and water. The liquid component contains water in a concentration generally greater than 80.0, and in most cases greater than 90.0 percent by weight. The superplasticizer may be dispersed in the water by any of several means, such as (but not limited to) miscible mixing, dissolution or solubilization, emulsification, suspension, and the like. A dissolved active superplasticizer component is preferred. Generally the concentration of superplasticizer contained in the liquid component is dependent upon the weight percentage of the difficult-to-settle solid particles contained in the slurry composition. Ordinarily relatively small proportions of superplasticizer are used relative to the mass of solidifying agent (e.g., cement). The slurry, the resultant compacted composition, and ultimately the hardened and cured product composition (i.e., solidified waste), contain at least 0.001, and normally at least 0.05 up to about 20, preferably up to 10, and most preferably up to 5 weight percent of active superplasticizer compound(s), calculated relative to the weight of dry aggregate component. Preferably about 0.2 to about 5, and often less than 3 weight percent of active superplasticizer compound is combined with the cement. It is highly preferred that the active component of a commercial superplasticizer be less than about 2 weight percent of the dry cement used in the slurry. In terms of addition of commercial concrete superplasticizer additives (wherein about 30–60 weight percent of the additive comprises active superplasticizer compound), it is preferred that greater than about 0.01, and usually about 1, to less than 8 weight percent, relative to the aggregate components, of ordinary concrete superplasticizer be added to the aggregate, and it is highly preferred that about 1 to about 4 weight percent be added.

The superplasticizer is usually a concrete superplasticizer containing at least one polymeric component or condensate selected from the group consisting of naphthalenes, melamines, sulfonated naphthalenes and melamines, and ligonsulfonates, in the form of salts, polymeric salts, and other water-soluble or water-dispersible forms. Preferred active superplasticizer components include an alkali or alkaline earth metal salt of a highly condensed naphthalene or melamine sulphonic (or sulphonylic) acid/formaldehyde condensate. Highly preferred superplasticizer components are available from the Sika Corporation under such trade names as "Sikament FF"—containing a melamine polymer sodium salt prepared with sulfonic acid, "Sikament 86"—containing a melamine polymer sodium salt prepared with sulfonylic acid, and "Sikament 300"—containing a mixture of sulfonated naphthalene and melamine polymers. The most highly preferred superplasticizers contain polymeric melamines. Other available superplasticizers for use in the invention include organic admixtures containing polyhydroxy-, and polyhydrocarboxylic acid groups such as salts of polymers of ethylenically polymerizable carboxylic acids, and the like. Others include arylsulfonic acidformaldehyde condensate salts.

Typically, the liquid component of the slurry composition contains free water (i.e., excessive water that is available to more than fully react with the solidifying agent of the aggregate mixture—more than a stoichiometrical amount). The amount of free water in the mixture of aggregate and liquid is unrestricted (particularly in the case of centrifugal casting); however, if less than the amount required to fully react with (e.g., hydrate) the cement is present, sufficient water must be supplied during cure to fully hydrate the reactants (i.e., cement). Normally when the cement is contacted by the superplasticizer, the cement is also in contact with sufficient amounts of free water to fully harden the cement into a solid/binding material during formation of the solidified waste in the storage vessel. One advantage of the presence of the superplasticizer is the relatively small amount of free water required to be contained in the slurry—typically less than 25 weight percent, usually less than 10 weight percent, and preferably less than 5 weight percent, relative to the weight of dry solidifying agent (e.g., hydraulic cement). The superplasticizer is usually homogeneously dispersed in the water prior to contact with the cement, filler, or combinations thereof.

The aggregate mixture typically includes an inorganic cement blend (e.g., Portland cement) and waste-containing filler (e.g., particles containing EPA or UCD classified waste and NORM material). A critical ingredient of the aggregate component is the solidifying agent, usually a dry hydraulic cement (i.e., a material which forms a slurry or paste when mixed with water and hardens into a solid or acts as a binding material). Cements are typically inorganic solids which activate their binding property with other solids by hydrating or forming precipitates after exposure to water.

A preferred dry inorganic cement is Portland cement. Portland cement contains CaO as one of the primary oxide components. Other significant oxide components include CaO, $SiO_2$ and $Al_2O_3$, with other inorganic compounds and/or metal oxides, such as Fe, Mg, K, S, Na, Ti, and Mn oxide being optionally present in smaller quantities. A compositional range reported in weight percent of the chief oxide components of Portland cement is as follows: Calcium Oxide (CaO) 60–67, Silica ($SiO_2$) 17–25, Alumina ($Al_2O_3$) 3–8, Iron Oxide ($Fe_2O_3$) 0.5–6, Magnesia (MgO) 0.1–4, Sulphur Trioxide ($SO_3$) 1–3, and Soda and/or Potash ($Na_2O+K_2O$) 0.5–1.3. The dry powder form of the cements used in the invention have a distribution of particles having a size (i.e., an average cross-sectional dimension) generally less than 100 microns (measured by conventional methods such as by a Coulter counter). Preferably, the particles are of average cross-sectional dimension at least 1 micron (by Coulter counter), and usually are less than about 75 microns, and preferably less than about 50 microns. Preferred cement particle distributions have at least 50 percent of the particle sizes in the range from about 5 to about 45 microns. (Cements and other aggregate components containing "essentially all" particles having average cross-sectional dimensions of at least 1 micron are known herein to contain greater than 98 volume percent of the particle distribution in particles of average cross-sectional dimension of at least 1 micron.)

The influence of superplasticizers in the invention is especially related to aggregate mixtures that, when combined with water, form difficult-to-compact slurries. A difficult-to-compact cement contained in a neat cement slurry (i.e., a slurry containing cement and water) is herein referred to as a "non-compatible hydraulic cement," i.e., a hydraulic cement whose total solid particles when thoroughly mixed with 38 weight percent water to form a degassed cement slurry devoid of superplasticizer and allowed to settle prior to set under an ordinary gravitational force (i.e., about a G-Force of 1), do not settle to the extent that they occupy a volume less than 90 volume percent of the original, degassed cement slurry volume. Generally, a slurry of the invention contains at least 0.1 dry weight percent of an active superplasticizer component, calculated relative to the solid components of the slurry that either hinder settling or require relatively large amounts of water to achieve a pumpable slurry viscosity, e.g., non-compatible hydraulic cement particles.

One example of a non-compatible cement useful in the invention is an expansive cement or non-shrinking cement (i.e., a cement which expands upon cure or does not undergo a net volume reduction following set while curing). Such a cement or cement/filler mixtures usually require larger amounts of water to overcome thixotropic properties than the amounts found when using the typical Type I–IV and Type–G conventional cements. An example of a non-shrinking cement is a magnesium oxide cement, a Plastic Porcelain No. 30, supplied by Sauereisen Cements Co., Pittsburgh, Pa. A more preferred expansive cement employed in the invention is a type-K or type-K-like blend cement. Other expansive cements are of Type M and S. Cement mixes which also contain fine silica ($SiO_2$), such as Hi—Sil (TM) or other silicon-based compositions such as Fly Ash, Cab—O—Sil (TM) and Silica Lite (TM), also pose compactibility problems where a superplasticizer is useful. Non-shrinking cements may also be mixed with other shrinking cements to form an acceptable solidified waste material. Such expansive cements preferably have particle size distributions wherein essentially all the particulates have an average cross-sectional dimension of at least 1 micron.

In another embodiment, a more chemically resistant cement (acid and/or base resistant) can be employed. The resistant cement, such as a calcium-aluminate (i.e., high alumina) cement, is used in place of expansive Portland-like cements, or mixed therewith. The $Al_2O_3$ content of high alumina cements (i.e., at least 35 percent by weight of the cement) exceeds that found in Portland cements. Although high alumina cement has been used to form hydraulic cement concretes which are more resistant to physical or chemical attack, other undesirable properties may make these hydraulic cements less satisfactory in a waste disposal operation. Nevertheless, superior waste disposal properties for concrete compositions which include a high alumina cement may be employed in this invention. The minimum and maximum amounts of high alumina cement used in the invention are essentially equal to the amounts previously disclosed for Portland cement. Typically, the particle size diameters of such cements range from 1 to about 12 microns.

Other types of cements which are normally reacted with sufficient amounts of water to form a precipitate or a bonding matrix are also acceptable. This includes other silicate-based cements and cements which contain organic materials.

Although only a trace amount of cement in the aggregate component is required, the quantity of cement needed is a function of the cement type and/or filler type, overall composition, processing parameters, and/or application. The proportion of cement (i.e., Portland or Portland-containing additive, as for example, Type-K) ranges from between 5 and 95 percent by weight of the total aggregate component, with the proportion of cement usually ranging between 25 and 75 percent by weight of the total aggregate component. Preferred dry compositions contain at least 50, and usually above 50 to about 70 percent by weight of cement in the aggregate component if high strengths and low mobility of the waste contaminants are desired.

The superplasticizers can enhance the compaction of difficult-to-compact cement/filler mixtures, i.e., slurries containing cement, water and non-waste and waste-containing filler. A difficult-to-compact cement/filler mixture is herein referred to as a "non-compatible hydraulic cement/filler slurry." i.e., an aqueous-solids mixture containing total solid particles comprising 70 weight percent of cement, with the balance being other solids of a cementitious and/or non-cementitious nature having an average cross-sectional dimension of at least 1 micron, that when thoroughly mixed with water comprising 38 weight percent of the degassed, resultant slurry devoid of superplasticizer and allowed to settle prior to set under an ordinary gravitational force (i.e., about a G-Force of 1), do not settle to the extent that they occupy a volume which is less than 90 volume percent of the original, degassed cementitious slurry volume.

The waste-containing filler encompasses the major remaining component of the aggregate mixture. The waste-containing filler usually encompasses between 10 and 90, and preferably at least 25 percent by weight of the dry aggregate mixture. In some high cement applications, the filler comprises from about 25 to less than 50 percent, and typically less than 35 percent, by weight of the dry aggregate mixture.

The waste-containing filler is a waste or waste source, usually in solid form, that is typically a concentrate residue, or derivative of a concentrate residue, as known in the field of chemical fixation and solidification (CFS for short). Other wastes may be NORM comprised of scales, sludges, films, etc., resulting from chemical processes. Types of waste, their characteristics, and contaminants contained therein, disposed of by the method of the invention, are generally classified under the U.S. EPA listing system and/or a classification system created by the University of California at Davis (UCD) are described by Jesse R. Conner, "Chemical Fixation and Solidification of Hazardous Wastes," by Van Nostrand Reinhold (1990),the disclosure of which is incorporated by reference in its entirety herein. Examples of waste-containing fillers, or sources thereof, are waste-containing solids such as sludge, shavings, residues, screenings, filter cake, precipitates, dusts, tailings, emulsion solids, bottoms, trimmings, glass, and the like. Preferred filler materials include siliceous sludge precipitated from a silica-rich geothermal brine, such as those disclosed in U.S. Pat. No. 4,761,182, issued to Whitescarver et al., the disclosure of which is incorporated by reference in its entirety herein.

The waste-containing filler preferably contains contaminants derived from chemically toxic wastes and/or radioactive toxic wastes, i.e., chemical and radioactive (radionuclides) toxic contaminants. The contaminants contained in such toxic waste materials that are typically chemical in nature include metals and metal components, and other inorganic components and organic components such as the contaminants disclosed in the above incorporated Conner reference. Examples of chemically toxic contaminants include sufficiently hazardous concentrations of the following: Arsenic, Barium, Benzene, Cadmium, Carbon disulfide, Carbon tetrachloride, Chlordane, Chlorobenzene, Chloroform, Chromium, o-Cresol$^a$, m-Cresol$^a$, p-Cresol$^a$, 2,4-D, 1,2-Dichlorobenzene, 1,4-Dichlorobenzene, 1,2-Dichloroethane, 1,1-Dichloroethylene, 2,4-Dinitrotoluene, Endrin, Heptachlor (and its hydroxide), Hexachlorobenzene, Hexachlorobutadiene, Hexachloroethane, Isobutanol, Lead, Lindane, Mercury, Methoxychlor, Methyl ethyl ketone, Nitrobenzene, Pentachlorophenol, Phenol, Pyridine, Selenium, Silver, Tetrachloroethylene, 2,3,4,6-Tetrachlorophenol, Toluene, Toxaphene, Trichloroethylene, 2,4,5-Trichlorophenol, 2,4,6-Trichlorophenol, 2,4,5-TP(Silvex), Vinyl chloride, as well as contaminants contained in EPA F-Wastes, EPA K-Wastes, EPA P-Wastes, EPA U-Wastes, and those classified in the UCD system. The method of the invention is preferably employed to dispose of the inorganic chemical toxic contaminants such as Arsenic, Barium, Cadmium, Chromium, Lead, Mercury, Selenium, Silver and the like. Examples of radioactive toxic contaminants including those found in the Uranium or Thorium decay series, such as Radium, Lead, Uranium, Thorium, Radon, etc.

In one embodiment, the waste-containing filler particles are contained in a nearly continuous distribution of sizes. The filler particles and the cement particles can be of sizes within the same order of magnitude; however, the filler materials preferably have distributions wherein essentially all particles have an average cross-sectional dimension of at least 1 micron and are normally at least as large in size as the cement particles.

Particle sizes of the aggregate mixture can be gradated to provide desired rheological properties suitable for enhanced densification of the solidified monolithic material in the storage-vessel. The waste-containing filler can include a powder-like waste solid, defined herein as a material having a distribution of particle sizes of average cross-sectional dimension from at least 1 to less than 100 microns. It is preferred that essentially all powder-like solid waste particles are of average dimension of at least 0.8, and preferably at least 1 micron. Examples of powder-like particle distributions contain particle sizes ranging from about 1 to about 80 microns; and a highly preferred waste material ranging from about 1 to about 50 microns. The waste-containing filler particles of the aggregate preferably include powder-like solid materials such as filter cakes (sludges) obtained from geothermal brine. In one highly preferred embodiment, the filler consists essentially of such powder-like waste-containing particles. The proportion of powder-like solid waste filler, as a dry weight percent of the aggregate component, ranges from 1 to about 90 percent, but preferably from 5 to 75 percent.

Using a gradated filler (i.e., a distribution of filler particle sizes) during settling helps to minimize the tendency of the solidified waste to form layers of smaller-sized particles and layers of larger—sized particles—which layers are undesirably devoid of sufficient amounts of solidifying agent. Use of specific gradated aggregates can result in a suitable homogeneous arrangement of cement and waste-containing filler particles in the solidified waste matrix and helps maximize the reduction of contaminant migration from the hardened matrix by limiting excessive segregation tendencies. In the invention, the presence of an active component of the superplasticizer compound homogeneously arranged with the cement and waste-containing filler particles provides further improved compactibility for a specific gradated aggregate distribution compared to the same gradated aggregate distribution not containing the additive superplasticizer. This is accomplished by reducing the slurry water or fluid content (particularly the free water) to maximize hindered settling and minimize colloidal suspension.

Control of the maximum size particle as well as the distribution of sizes (i.e. gradation) can be important in obtaining optimum results, especially when the solid slurry or the resultant compacted composition is introduced into a subterranean formation such as a petroleum or geothermal well. The maximum particle size is a function of desired reduction of contaminant migration, storage vessel dimensions (cracks, etc.), and desired degree of pumpability of the slurry. The maximum particle size, i.e., average cross-sectional dimension, is generally less than about 18 millimeters (mm), preferably less than 6 mm, and most preferably less than about 2.6 mm (i.e., 2600 micron) for radioactive waste storage and for sizes currently used in the prevention of toxic waste leaching, preferably less than 2 mm (No. 10 sieve), and most preferably less than 10 micron.

Controlling the weight ratio of the quantity of the filler particles in the aggregate to the quantity of the cement in the aggregate is a method for directly controlling cured solidified waste properties. A range of cement:filler ratios from 1:4

(one part cement to four parts waste filler) to 20:1 (twenty parts cement to one part filler) produces solidified waste normally having sufficient stabilization. A nominal weight ratio of at least one part cement to one part filler produces a structurally strong matrix. A maximum waste powder content of 50 percent by weight of total dry solids is a typical practical limit independent of the cement:waste powder ratio, particularly when non-waste-containing fillers are also present in the solidified waste.

Although other components may be present in the solid or aggregate mixture, specifically limited or excluded is dust-like waste filler particles, i.e., inorganic particles having an average cross-sectional dimension (size) of less than about 0.5 micron. Significant quantities of ultrafine inorganic particles were previously cited (i.e., in U.S. Pat. No 4,588,443, issued to Bache) as important to the integrity of cement. Testing of material made from selected aggregate and specific liquid components, but excluding the ultrafine inorganic particles, has yielded highly compacted solidified waste material having high compressive strength. Solidified waste produced from aggregate mixtures which contain essentially no particles of average cross-sectional dimension less than 0.5 micron can withstand harsh environments that otherwise cause contaminant migration. However, incidental, insignificant amounts of particles of dimension less than 1 micron, i.e., less than two percent by volume of the solid component, may inadvertently be contained in a distribution due to abrasion, etc. Such incidental amounts are typically found in the tails of particle size distributions for commercially available products.

In the method of the invention the two component mixture, as described above, is used for casting applications to dispose of waste. The first step is to mix the solid and liquid components to form a slurry. The mixing step can be accomplished by first pre-mixing the solids (i.e., commingling and breaking up agglomerates) and then adding and mixing the liquid component containing active superplasticizer component to obtain a desired slurry consistency. If the waste-containing masses are too large to form a mobile(pumpable) slurry, the masses can be reduced by conventional solid particle-reducing means, such as grinding, pulverizing, crushing, milling, and the like. Optionally, amorphous silica additives may be pre-blended with the dry mix. Also, fibers can be similarly blended or added later to the mixture.

Typically the liquid component is combined with the aggregate component in a liquid-to-total solids weight ratio greater than 0.5:1 to produce a slurry having a workable consistency. Usually the viscosity of the slurry is above about 100 centipoise, for example, a viscosity in the range from about 120 to about 135 centipoise measured at a shear rate of 200 rpms can provide a suitable workability for a Type-K cement/filler powder mixture (70/30 weight ratio) combined with the liquid component containing superplasticizer. For a predetermined workable slurry consistency, usually the volume of superplasticizer decreases in the liquid component as the viscosity of the slurry increases. Alternatively, a given viscosity can be maintained by increasing the volume of superplasticizer in the liquid component and reducing the liquid-to-solids ratio in the slurry. For instance, in the above-described Type-K cement/filler powder mixture with liquid component, the 120–135 viscosity can be maintained with a liquids-to-solids ratio of about 0.65:1 when the superplasticizer concentration is nearly zero, i.e., 0.01 percent, whereas a ratio of about 0.5:1 achieves the desired viscosity as the superplasticizer concentration reaches about 4 percent by weight, relative to the cement.

Following its formation, the slurry is transferred to a storage vessel, such as an abandoned petroleum or geothermal well. Conveyance may be accomplished by means such as pumping the liquid-like slurry, gravity flow of the slurry via troughs, moving via belt, and auger or portable trough conveyance.

The transferred slurry is then allowed to naturally settle to shape the material into the underground formation. Due to the presence of the superplasticizer, the slurry solids are more compact, occupy a smaller volume and have a higher density than a similarly prepared waste slurry or solidified material lacking the superplasticizer.

In the final hardening step the slurry is allowed to set and cure. The cure normally occurs at the temperature of the storage vessel for a time sufficient to achieve a predetermined strength of the concrete. Elevated temperature curing (i.e., steam curing) may also be employed, and is preferred for some instances. Exposing the solidified waste to aqueous fluids at elevated temperatures (e.g., geothermal fluids) may also result in further accelerated long-term curing of the material. After the solidified waste is placed in storage and the solid exposed to harsh aqueous fluids, the inorganic cement particles may undergo hydrothermal alteration. Since significant hydration of the cement particles occurs during the initial hardening phase of the solidified waste, a newly formed matrix may slowly overlay or replace the original matrix resulting from the initial hydration step. Initial or pre-storage properties may therefore not be indicative of later storage properties when a geothermal fluid is in contact with the solidified waste.

The invention satisfies the need to provide a low cost, easy to transfer waste-containing material for storage in either mild or harsh environments. The solidified concrete material has less contaminant leachability compared to the untreated waste-containing filler, and less contaminant leachability compared to a comparably prepared counterpart lacking superplasticizer. In a preferred embodiment, ultrafine aggregate particles (i.e., dust-like waste filler) have been limited or excluded from the mixture. The mixture hardens to provide a strong, highly compacted, stabilized solidified waste having acceptable waste leachability and/or waste particle migration properties.

While particular embodiments of the invention have been described, it will be understood, of course, that the invention is not limited thereto since many obvious modifications can be made, and it is intended to include within this invention any such modifications as will fall within the scope of the invention as defined by the appended claims.

What is claimed is:

1. A method for disposing of waste by preparing a waste-containing hydraulic cementitious composition, said method comprising:

mixing solid particles comprising dry hydraulic cement and waste-containing filler particles with a superplasticizer and water to form a mobile slurry wherein essentially all of said solid particles being of average cross-sectional dimension greater than aobout 1 micron, said solid particles comprising greater than 50 dry weight percent of said hydraulic cement, and said slurry containing less than 25 weight percent of free water relative to the weight of said dry hydraulic cement;

transferring said slurry into a storage vessel; and permitting said slurry to harden into a concrete composition containing stabilized waste contaminants.

2. The method defined in claim 1 wherein said solid particles are essentially homogeneously distributed in said concrete composition.

3. The method defined in claim 1 wherein said hydraulic cement comprises a non-compactible hydraulic cement or said slurry comprises a non-compactible hydraulic cement/filler slurry when devoid of a superplasticizer.

4. The method defined in claim 2 wherein said concrete composition has a greater compressive strength than a comparably prepared concrete composition containing no superplasticizer or reaction product incorporating said superplasticizer.

5. The method defined in claim 1 wherein said slurry is hardened in the presence of sufficient water to fully hydrate said cement.

6. The method defined in claim 1 wherein said waste-containing filler particles are selected from chemical or radioactive toxic contaminants.

7. The method defined in claim 1 wherein said waste-containing filler particles comprise radioactive toxic contaminants, and essentially all of said waste-containing particles are of average cross-sectional dimension less than 18 millimeters.

8. The method defined in claim 6 wherein said dry hydraulic cement particles comprise non-shrinking hydraulic cement.

9. The method defined in claim 1 wherein said waste-containing particles comprise chemical toxic contaminants and essentially all said waste-containing particles are of average cross-sectional dimension greater than 1 micron and less than 2 millimeters.

10. The method defined in claim 1 wherein said superplasticizer comprises at least one active superplasticizer component selected from the group consisting of polymers and condensates of sulfonated naphthalenes, melamines and lignosulfonates.

11. The method defined in claim 1 wherein an active superplasticizer component contained in said superplasticizer comprises greater than 0.01 to about 5 weight percent relative to the weight of said dry solid particles.

12. The method defined in claim 7 wherein said slurry is pumped to an interior bore of a well in communication with a storage vessel comprising a subterranean formation.

13. The method defined in claim 3 wherein said non-compactible hydraulic cement comprises a expansive hydraulic cement.

14. The method defined in claim 1 wherein said waste-containing filler comprises at least 25 dry weight percent of said solid particles.

15. The method defined in claim 1 wherein said concrete composition is denser than a comparably prepared concrete composition containing no superplasticizer.

16. The method defined in claim 2 wherein said concrete composition is located in a subterranean formation and said waste-containing filler particles comprise naturally occurring radioactive material.

17. The method defined in claim 1 wherein said superplasticizer is a concrete superplasticizer comprising a polymeric sulfonated melamine component.

18. The method defined in claim 1 wherein said waste-containing filler is waste-containing solids comprising sludge, shavings, residues, screenings, filter cake, precipitates, dusts, tailings, emulsion solids, bottoms, trimmings or glass.

19. A method for disposing of waste by producing a solidified waste, said solidified waste produced from a mixture of a solid component and a liquid component, said solid component containing at least 10 dry weight percent of particles of a waste-containing filler comprising radionuclide and/or chemical toxic contaminants and at least 50 dry weight percent of particles of hydraulic cement wherein essentially all of said particles of said cement and said filler are of average cross-sectional dimension greater than 1 micron and less than 18 millimeters, and said liquid component containing water and an active superplasticizer component, said method comprising the following steps:

(1) mixing said liquid component and said solid components, said liquid component containing less than 25 weight percent of free water relative to the weight of said dry hyraulic cement;

(2) transporting the mixed components from step (1) to a storage vessel; and (3) permitting the mixed components from step (1) to harden into a stabilized solidified waste comprising a concrete composition in the presence of sufficient water to fully hydrate said cement.

20. The method defined in claim 19 wherein said waste-containing filler particles are selected from chemical or radioactive toxic filler particles.

21. he method defined in claim 19 wherein said waste-containing filler is waste-containing solids comprising sludge, shavings, residues, screenings, filter cake, precipitates, dusts, tailings, emulsion solids, bottoms, trimmings, or glass.

22. The method defined in claim 19 wherein said mixed component from step (1) contain less than 10 weight percent of free water relative to the weight of said hydraulic cement and said solid particles are essentially homogeneously distributed in said concrete composition.

23. the method defined in claim 19 wherein said storage vessel comprises a subterranean formation and said transporting in step (2) is through a well penetrating at least a portion of said formation.

24. A hydraulic cement slurry composition comprising an aggregate component containing a non-compactible hydraulic cement and waste-containing filler particles, and a liquid component comprising sufficient water to fully hydrate said hydraulic cement, and at least one active superplasticizer component and wherein essentially all of the solid particles of said aggregate component being of average cross-sectional dimension greater than about 1 micron, said aggregate component comprising greater that 50 dry weight percent of said non-compactible hydraulic cement, and said slurry containing less than 25 weight percent of free water relative to the weight of the dry non-compactible hydraulic cement.

25. The composition defined in claim 24 wherein said waste-containing filler particles comprise greater than about 25 weight percent of said aggregate component.

26. The composition defined in claim 24 wherein said non-compactible hydraulic cement comprises an expansive hydraulic cement.

27. The composition defined in claim 24 wherein said non-compactible hydraulic cement is a Portland cement or a high alumina cement.

28. The composition defined in claim 27 wherein said non-compactible hydraulic cement comprises a Type K cement.

29. The composition defined in claim 24 wherein said active superplasticizer component contains at least one salt component selected from the group consisting of polymers and condensates of sulfonated naphthalenes, melamines, and lignosulfonates.

30. The composition defined in claim 24 wherein said active superplasticizer component comprises a polymeric sulfonated melamine component.

31. The composition defined in claim 24 wherein said waste-containing filler particles are waste-containing solids comprising sludge, shavings, residues, screenings, filter cake, precipitates, dusts, tailings, emulsion solids, bottoms, trimmings, glass, geothermal sludges or geothermal brine precipitates.

32. The composition defined in claim 24 wherein said active superplasticizer component comprises about 0.01 to about 5 dry weight percent of said aggregate component.

33. A compacted cementitious composition comprising a compacted form of said slurry composition defined in claim 24.

34. A monolithic solid comprising a hardened compacted cementitious composition defined in claim 33 having homogeneously distributed cement and stabilized waste-containing filler particles.

35. A pumpable slurry composition comprising a non-compactible hydraulic cement/filler slurry comprising an aggregate component comprising hydraulic cement particles and waste-containing filler particles, and sufficient water to fully hydrate said hydraulic cement particles, said composition further comprising at least one active superplasticizer component, and wherein said hydraulic cement particles and said waste-containing filler particles having essentially all particles of average cross-sectional dimension at least about 1 micron and less than about 18 millimeters, said aggregate component comprising greater than 50 dry weight percent of said hydraulic cement particles, and said slurry containing less than 25 weight percent of free water relative to the weight of said dry hydraulic cement particles.

36. The composition defined in claim 35 wherein said hydraulic cement comprises an expansive cement.

37. The composition defined in claim 35 wherein said hydraulic cement comprises a Portland cement and said waste-containing filler particles are selected from radioactive or chemical toxic contaminants.

38. The composition defined in claim 36 wherein said waste-containing filler particles comprise naturally occurring radioactive material.

39. The composition defined in claim 35 wherein said waste-containing filler particles are waste-containing solids comprising sludge, shavings, residues, screenings, filter cake, precipitates, dusts, tailing, emulsion solids, bottoms, trimmings, glass, geothermal sludges or geothermal brine precipitates.

40. The composition defined in claim 35 wherein said superplasticizer contains at least one salt component selected from the group consisting of polymers and condensates of sulfonated naphthalenes, sulfonated melamines, and lignosulfonates.

41. The composition defined in claim 35 wherein said active superplasticizer component comprises greater than 0.1 weight percent relative to the dry weight of said aggregate component.

42. The method defined in claim 35 wherein said waste-containing filler particles consist essentially of radioactive or chemical toxic contaminants.

43. A hardened waste-containing concrete prepared from the slurry defined in claim 33 having a mean compressive strength greater than that a of a hardened waste-containing concrete prepared without said superplasticizer.

44. A cementitious composition comprising:
(1) homogeneously arranged, fully hydrated or precipitated cementitious inorganic solid particles, essentially all of which are of average cross-sectional dimension at least about 1 micron; and
(2) densely packed waste-containing solid filler particles, essentially all of which are of average cross-sectional dimension at least about 1 micron and less than about 18 millimeters; and wherein said particles of (1) and an active superplasticizer component are homogeneously distributed in the volume between said particles of (2) and said particles of (2) comprise up to 50 weigth dry weight percent of the total solid particles of said composition.

45. The composition defined in claim 44 wherein said superplasticizer component comprises from 0.01 to 10 dry weight percent of said solid particles of (1) and (2).

46. The composition defined in claim 44 wherein said particles of (1) comprise an expansive hydraulic cement.

47. The composition defined in claim 46 wherein said particles of (2) comprise radioactive or chemical toxic contaminants.

48. The composition defined in claim 44 wherein said active superplasticizer component is selected from the group consisting of polymers and condensates of sulfonated naphthalenes, sulfonated melamines, and lignosulfonates.

49. The composition defined in claim 24 wherein said non-compatible hydraulic cement, said water and said waste-containing filler particles comprise a non-compactible hydraulic cement/filler slurry, and essentially all of said aggregate component comprises solid particles of average cross-sectional dimension above about 1 micron to less than about 18 millimeters.

50. The composition defined in claim 44 wherein said waste-containing filler particles are waste-containing solids comprising sludge, shavings, residues, screenings, filter cake, precipitates, dusts, tailing, emulsion solids, bottoms, trimmings or glass.

51. The composition defined in claim 44 wherein said waste-containing filler particles of (2) comprise naturally occurring radioactive material and essentially all of said waste-containing filter particles of (2) are of average cross-sectional dimension less than 18 millimeters.

52. A hardened concrete composition prepared by mixing solid particles comprising dry hydraulic cement and waste containing filler particles with about 0.1 to 4 weight percent of an active superplasticizer compound, relative to the dry weight of said solid particles, and water to form a mobile slurry wherein essentially all of said solid particles being of average cross-sectional dimension greater than about 1 micron, said solid particles comprising greater than 50 dry weight percent of said hydraulic cement, and said slurry containing less than 25 weight percent of free water relative to the weight of said dry hydraulic cement:

transferring said slurry into a storage vessel; and permitting said slurry to harden into a concrete composition containing stabilized waste contaminants.

53. A hardened concrete composition according to claim 52, wherein said hydraulic cement comprises a non-compactible hydraulic cement or said slurry comprises a non-compactible hydraulic cement/filler slurry when devoid of a superplasticizer.

54. A cementitious composition prepared by mixing a solid component and a liquid component, said solid component containing at least 10 dry weight percent of particles of a waste-containing filler comprising radionuclide and/or chemical toxic contaminants and at least 50 dry weight percent of particles of type K cement wherein essentially all of said particles of said cement and said filler are of average cross-sectional dimension greater than about 1 micron and less than 18 millimeters, and said liquid component containing less than 25 weight percent fee water relative to the weight of said dry cement and 0.01 to 5 weight percent of an active superplasticizer compound, relative to the dry weight of said solid particles;

transporting the mixed components to a storage vessel; and permitting the mixed component to harden into a stabilized solidified waste comprising a concrete composition in the presence of sufficient water to fully hydrate said cement.

* * * * *

UNITED STATES PATENT AND TRADEMARK OFFICE
CERTIFICATE OF CORRECTION

PATENT NO. : 5,551,976
DATED : September 3, 1996
INVENTOR(S) : William C. Allen

It is certified that error appears in the above-indentified patent and that said Letters Patent is hereby corrected as shown below:

Claim 1, column 12, line 56, replace "aobout" with
-- about --.

Claim 21, column 14, line 20, replace "he" with
-- The --.

Claim 23, column 14, line 30, replace "the" with
-- The --.

Claim 43, column 15, line 55, replace "33" with
-- 35 --; line 56, delete first occurrence of "a".

Claim 52, column 16, line 38, after "0.1 to" insert
-- about --.

Claim 54, column 17, line 3, replace "component" with
-- components --.

Signed and Sealed this

Twenty-fourth Day of November, 1998

Attest:

BRUCE LEHMAN

Attesting Officer

Commissioner of Patents and Trademarks